Patented July 12, 1949

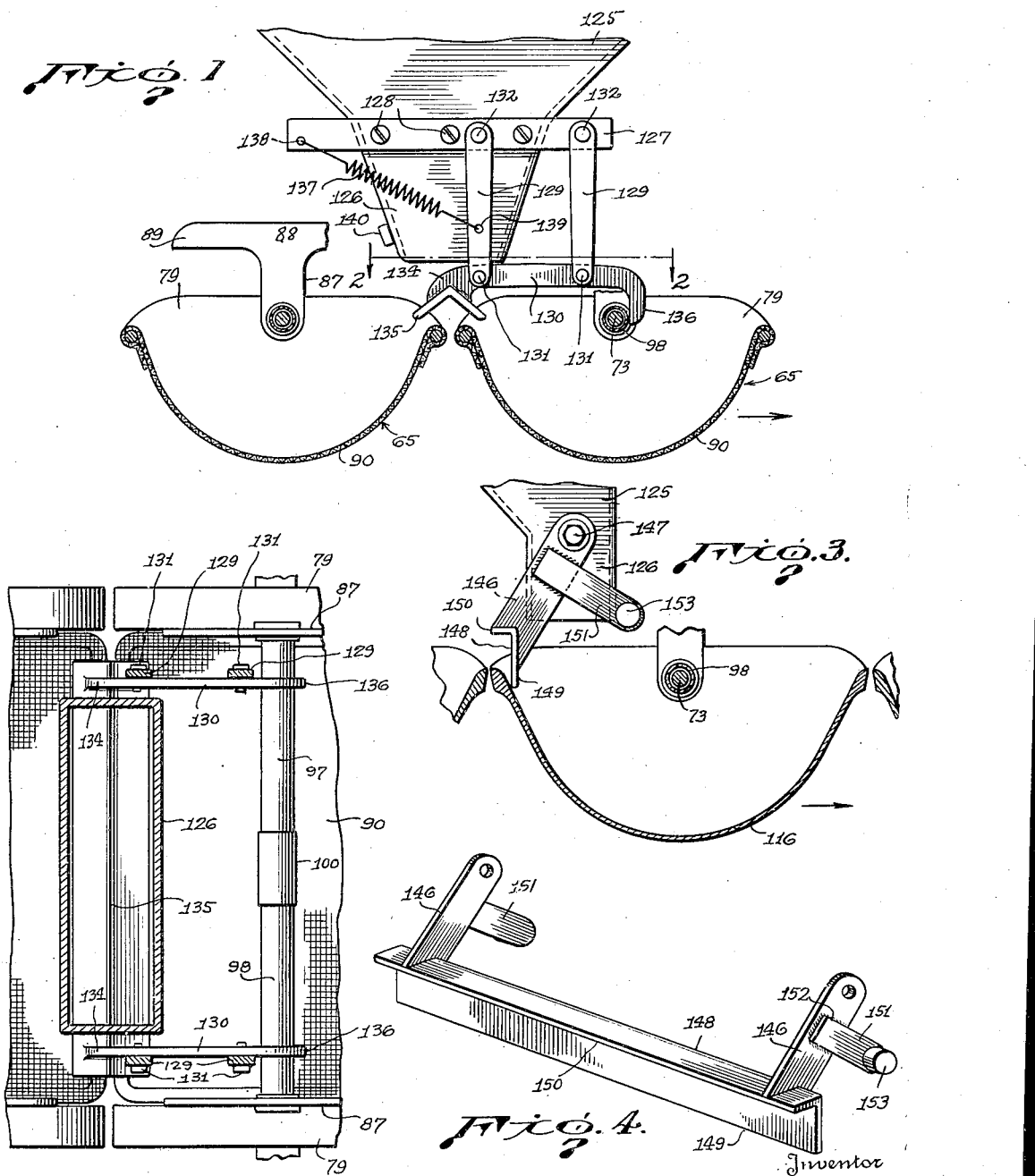

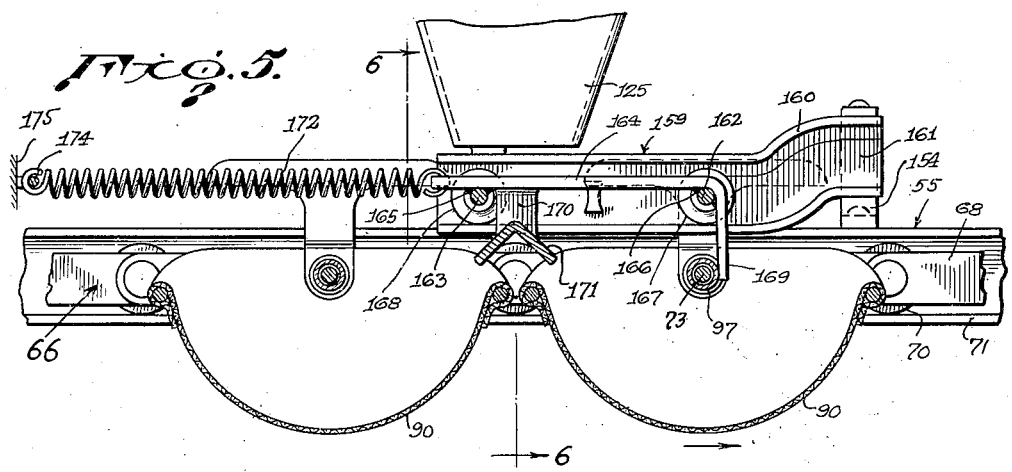
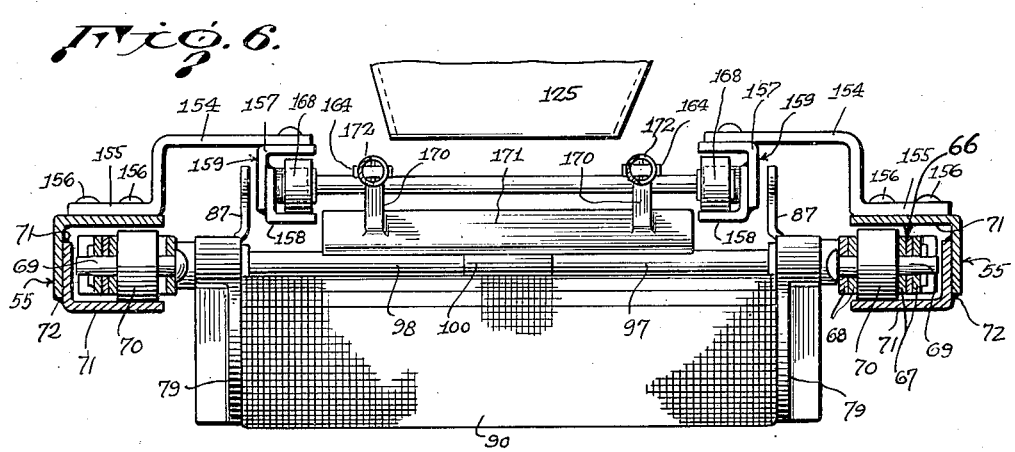
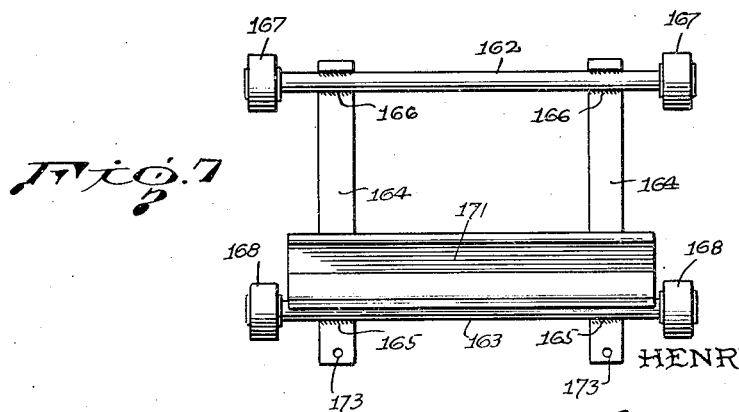

2,476,039

UNITED STATES PATENT OFFICE 2,476,039

MATERIAL LOSS-PREVENTING DEVICE FOR BUCKET CONVEYERS

Henry W. Hapman, Detroit, Mich., assignor, by mesne assignments, of sixty per cent to Henry W. Hapman and forty per cent to Hannah J. Hapman, both of Detroit, Mich.

Application March 18, 1944, Serial No. 527,036

7 Claims. (Cl. 198—52)

The present invention relates to improvements in bucket conveyors, and more particularly, to devices for preventing loss of materials by falling through the gaps between the buckets.

One object of the invention is to provide a bucket conveyor therefor having a novel filling means arranged relative to the conveyor buckets so as to eliminate the waste and loss of material while the buckets are being filled as they pass beneath the loading hopper.

Another object of the invention is to provide a bucket conveyor in which the filling and loading means is provided with a guard for directing the material into the buckets as they pass beneath the loading station and to protect the space between the buckets from the dropping of material therebetween.

Other objects and advantages will become apparent during the course of the following description of the accompanying drawings, wherein:

Figure 1 is a side elevational view of a bucket conveyor equipped with a material loss preventing device according to one form of the invention, showing a loading hopper equipped with a guard member supported thereby for directing the material discharged from the hopper into the buckets as they traverse beneath the loading station;

Figure 2 is a horizontal cross-sectional view taken on line 2—2 in Figure 1 further illustrating the guard member for overlapping the edges of the conveyor buckets as they pass beneath the filling hopper;

Figure 3 is a side elevational view of a filling hopper similar to Figure 1 showing a slightly modified form of guard member for overlapping the adjacent edges of the conveyor buckets as the buckets pass beneath the loading hopper;

Figure 4 is a perspective view of the bucket edge-overlapping member guard shown in Figure 3;

Figure 5 is a side elevational view of the loading hopper similar to Figure 1 and illustrating in detail the slightly modified form of guard member for overlapping the adjacent edges of the buckets as they traverse the loading station;

Figure 6 is a vertical cross-sectional view taken on the zig-zag line 6—6 in Figure 5 further showing the manner in which the modified guard member is supported to travel and reciprocate beneath the filling hopper so as to protect the meeting edges of the conveyor buckets as they travel beneath the loading station;

Figure 7 is a bottom plan view of the guard member shown in Figures 5 and 6.

Referring to the drawings in detail, Figures 5 and 6 show a portion of a conveyor including a pair of spaced endless chains 66 having inner and outer links 67 and 68 connected by pivot pins 69. The links 67 and 68 are spaced by means of rollers 70 which are adapted to travel in the channel shaped guideways 55. As shown in Figure 6, the guide ways are formed of angle-bars 71 welded or otherwise secured together as at 72 with one of their flanges in overlapping relation. The rollers 70 are adapted to ride and travel in said channel guide members 55 and extending between and supported by the conveyor chains 66 in a series of supporting rods 73 with their ends projecting through alternate sets of chain links 67 and 68 so as to supplement alternate pivot pins 69.

Rotatably mounted on the shaft 73 is a pair of end plate members 79 having openings for permitting the passage of said rod 73, and carrying tripping arms 87 so that the inner surface of the tripping arms may be substantially flush with the inner surface of the end plate 79. The free end of the tripping arm 87 may be T-shaped as at 88 to provide hooked portions at each end thereof as at 39.

Extending between and connected spaced pairs of end plates 79 is a conveyor bucket 90 formed of a wire screen member having its upper edge bent over a rectangular frame and held in place by U-shaped clips.

The end plate members 79 were held in spaced apart relationship by means of a pair of tubular shafts 97 and 98 yieldingly urged apart so that the ends thereof will engage washers in abutting relationship with the tripping arms 87. The rod 97 is provided with a short tubular section 100 welded thereto as at 101 for telescopically receiving the inner end of the tubular section, 98. A coil spring (not shown) encircles the shaft 73 and is mounted in the short tubular section 100 with one of its ends abutting the end of the tubular shaft 97 and its other end in abutting relationship with the tubular shaft 98. It will thus be seen that the shafts 97 and 98 will be yieldingly urged apart to create a pressure on the washer and thereby seal the shaft 73 against the entrance of material being conveyed with the elimination of considerable wear.

The conveyor chains 66 are trained over sprocket wheels mounted on shafts (not shown) driven in a conventional way such as by an electric motor through reduction gearing. Such driving mechanism is well known to those skilled in the conveyor art and its details form no part of the present invention.

Conveyor feed mechanism

As shown in Figure 1, a feed hopper 125 is disposed above the channel guideways 55 and said hopper is provided with a discharge spout 126 disposed above the conveyor buckets 90 so as to discharge material therein as the buckets traverse the area beneath the discharge spout. In order to prevent the material from falling between the buckets, a guard member is provided and is adapted to overlie the edges of adjacent buckets during their travel beneath the loading area of the discharge spout. Said guard member (Figures 1 and 2) comprises a pair of bracket plates 127 bolted to the side walls of the hopper 125 as by means of machine screws or the like 128. Pivoted to and depending from the bars 127 is a pair of parallel swinging links 129 having their free ends connected by a bar member 130 as at 131 to freely swing thereon. The upper ends of the links 129 are similarly pivoted as at 132 to the bar members 127. It will thus be seen that there is provided a bar member adjacent each end of the hopper discharge port 126 and said bars are provided with extensions 134 which are interconnected by a V-shaped guard member 135 extending therebetween. The opposite ends of the bar members 130 are hooked as at 136 (Figures 1 and 2) and are adapted to be engaged by the tubular sleeves 97 and 98 of the conveyor buckets to cause the guard member 135 to travel a predetermined distance with the conveyor buckets and at the same speed thereof so that the guard member 135 will be disposed above the meeting edges of adjacent conveyor buckets (Figure 1). After the foremost conveyor bucket has travelled a predetermined distance, the hooked end 136 is swung upwardly and released from engagement with the conveyor supporting rods 97 and 98. A coil spring 137 has one of its ends fastened to one of the bracket bars 127 as at 138 while its other end is connected to one of the depending links 129 as at 139. The spring 137 yieldingly retracts the guard member 135 and places the same in position for being engaged by the next conveyor bucket supporting rod so as to travel along with the conveyor buckets as they traverse the loading station. A stop bar 140 extends across one side of the discharge spout 126 and is welded thereto with the ends projecting slightly beyond the edges of the discharge spout into the path of the swinging arms 129. The coil spring 137 will swing the guard 135 to the left after the hook 136 has been released so that the guard will be in position to protect the edges of adjacent buckets as they travel beneath the hopper.

After the conveyor buckets have been loaded, they travel onward to their destination where they are dumped into a collection hopper by engaging inwardly projecting tripping pins (not shown) which extend inwardly into the path of the tripping arm 87 affixed to each end of the conveyor buckets. Obviously, the tripping brackets may be placed in any desired position and similarly, the deposit receptacle or collection hopper may be located anywhere along the discharge run of the conveyor.

Modified loading and guard mechanism

As shown in Figures 3 and 4, a slightly modified structure to that shown in Figures 1 and 2 is provided and in the modification the loading hopper 125 is provided with a discharge spout 126 similar in construction to the form of the invention shown in Figures 1 and 2. Pivoted to each side of the hopper 125 is a swinging arm 146 pivoted by means of a bolt or the like as at 147 affixed to the hopper 125. The free ends of the pivoted bars 146 are interconnected by an angle bar 148 similar in construction to the angle bar 135 in Figures 1 and 2 and said angle bar is adapted to overlie the meeting edges of the conveyor buckets 90 or 116 as they travel beneath the discharge spout 126. One of the flanges as at 149 is formed slightly longer than the other flange 150 so that the flange 149 will extend downwardly and engage the edge of the foremost buckets (Figure 3) whereupon the continued travel of the conveyor buckets will cause the other flange 150 to be moved downwardly over the adjacent edge of the following bucket. Each of the pivoted bars 146 is provided with an extension 151 welded or otherwise secured in place as at 152 and the free ends of said extensions 151 are provided with weighted members 153 to return the angle bar 148 after it has travelled in overlapping relation with the adjacent edges of a pair of conveyor buckets past the discharge spout 126.

Still further modified loading station mechanism

Another form of loading station mechanism is shown in Figures 5, 6 and 7, and as illustrated, the loading hopper 125 is of a slightly different shape although similar in construction and operation to the hopper 125 shown in Figures 1 and 2. The hopper 125, as in Figure 1, is disposed above the channel guideways 55 and located therebetween so as to continuously discharge material into the reticulate conveyor buckets 90. A guard mechanism is provided for the adjacent edges of the buckets as they traverse the loading station and said guard mechanism comprises spaced bracket members 154 having extensions 155 secured to the opposed channel guideway 55 by means of rivets or the like as at 156. The free ends of the angle brackets 154 are fastened to a pair of angle bars 157 and 158 which are welded together to form a channel member 159 along each side of the loading hopper 125. The channel members 159 are offset longitudinally adjacent one end thereof as at 160 to provide an elevated portion 161 (Figure 5). A carriage is movably mounted and supported by the channel members 159 and said carriage includes a pair of axle members 162 and 163 connected together by strap irons 164 by means of welding or the like as at 165 and 166 respectively. The ends of the axles 162 and 163 are provided with rollers 167 and 168 which are received in the channel members 159 for movement therealong. One end of each strap iron 164 is bent down as at 169 to form a hook member extending into the path of the conveyor supporting rods 97 and 98 so that the carriage will travel in the same direction as the conveyor buckets 90 for a portion of their movement beneath the loading hopper. Extending downwardly from each strap iron 164 is a bar 170 (Figures 5 and 6) and said bars 170 are connected by an angle-shaped guard bar 171 adapted to overlie the adjacent edges of conveyor buckets during their travel beneath the loading hopper 125. A coil spring 172 is connected at one end to each strap iron 164 and at the opposite end to an eyelet 174 on a suitable support or the like 175. It will thus be seen that if the guard bar 171 travels a slight distance beneath the hopper 125 in overlying relationship with adjacent edges of conveyor buckets, one end of the carriage will be tilted upwardly as the foremost rollers 167 on the ends of the axle 162 ride upwardly in the offset portion 160 of the channel members 159. The upward travel of the carriage causes the hook end 169 of each strap iron 164 to be disengaged from the conveyor supporting rod 97 so as to permit the spring 172 to retract the carriage and reposition the guard bar 171 adjacent the next pair of adjacent bucket edges. In the guard mechanism shown in Figures 1 to 7 inclusive, the purpose is to prevent the material from falling between the buckets as they traverse the loading station and still permit a continuous flow of material from the hopper and thereby eliminate various types of feed control mechanisms such as cutoffs and valves.

What I claim is:

1. A conveyor structure comprising a frame having thereon a conveyor passageway, a conveyor including a pair of conveyor chains arranged in said passageway and conveyor buckets supported by said conveyor chains, means for loading said buckets, means oscillatable to and fro relatively to said loading means over the gaps between said buckets comprising a material deflector oscillatably mounted on said frame beneath said loading means and over the gaps between said conveyor buckets for preventing material passing between said buckets while being loaded as they traverse the loading means, said deflector having a portion thereof successively engageable with moving parts of said conveyor and disengageable therefrom in response to a predetermined distance of travel thereof, and a deflector retracting element connected to said deflector and operative to return said deflector to its starting position upon release thereof at the end of said predetermined distance of travel of said conveyor.

2. A conveyor structure comprising a frame having thereon a conveyor passageway, a conveyor including a pair of conveyor chains arranged in said passageway and conveyor buckets supported by said conveyor chains, means for loading said buckets, means comprising a material deflector oscillatably mounted on said frame beneath said loading means and over the gaps between said conveyor buckets for preventing material passing between said buckets while being loaded as they traverse the loading means, said last-mentioned means consisting of a movable member oscillatable to and fro relatively to said loading means over the gaps between said buckets, said movable member being oscillatably mounted on said frame over the gaps between the meeting edges of the conveyor buckets and having a bucket-engaging portion operated by its engagement with the conveyor buckets to cause said movable member to travel in edge overlapping relationship with the buckets as the buckets traverse said loading means, mechanism responsive to a predetermined travel of the engaged conveyor bucket for releasing said bucket-engaging portion, and a retracting element connected to said movable member and operable to return the same to its starting position after release thereof.

3. A conveyor structure comprising a frame having thereon a conveyor passageway, a conveyor including a pair of conveyor chains arranged in said passageway and conveyor buckets supported by said conveyor chains, means for loading said buckets, means comprising a material deflector oscillatably mounted on said frame beneath said loading means and over the gaps between said conveyor buckets for preventing material passing between said buckets while being loaded as they traverse the loading means, said last-mentioned means comprising a reciprocating deflector oscillatable to and fro relatively to said loading means over the gaps between said buckets and operable by engagement with said buckets and movable in edge overlapping relationship therewith for a relatively short travel of said buckets during their movement beneath said loading means, mechanism responsive to a predetermined travel of the engaged bucket for releasing said deflector, and a deflector retracting element connected to said deflector and operable to return the same to its starting position after release thereof.

4. A conveyor structure comprising a frame having thereon a conveyor passageway, a conveyor including a pair of conveyor chains arranged in said passageway and conveyor buckets supported by said conveyor chains, means for loading said buckets, and means for preventing material passing between said buckets while being loaded as they traverse the loading means, said last-mentioned means consisting of a pivoted deflector plate oscillatable to and fro relatively to said loading means over the gaps between said buckets operable by engagement with said conveyor buckets and supported between the loading means and the conveyor buckets to travel with said buckets a short distance during their movement beneath the loading means.

5. A device for preventing loss of material through the gap between adjacent buckets of a bucket conveyor traveling past a loading apparatus, comprising an oscillatable deflector positioned above the gap between conveyor buckets, a support mounted in a stationary position relatively to said loading apparatus, a releasable driving portion connected to said deflector and engageable with a portion of a bucket to move said deflector in response to the motion of said bucket, a deflector carrier connected between said deflector and said support, and means for returning said deflector to a predetermined position upon release by the bucket engaged by said driving portion.

6. A device for preventing loss of material through the gap between adjacent buckets of a bucket conveyor traveling past a loading apparatus, comprising an oscillatable deflector positioned above the gap between conveyor buckets, a support mounted in a stationary position relatively to said loading apparatus, a releasable driving portion connected to said deflector and engageable with a portion of a bucket to move said deflector in response to the motion of said bucket, a deflector carrier connected between said deflector and said support, and means for returning said deflector to a predetermined position upon release by the bucket engaged by said driving portion, said carrier comprising a lever structure pivotally and swingably connecting said deflector to said support.

7. A device for preventing loss of material through the gap between adjacent buckets of a bucket conveyor traveling past a loading apparatus, comprising an oscillatable deflector positioned above the gap between conveyor buckets, a support mounted in a stationary position relatively to said loading apparatus, a releasable driving portion connected to said deflector and engageable with a portion of a bucket to move said deflector in response to the motion of said bucket, a deflector carrier connected between said deflector and said support, and means for returning said deflector to a predetermined position upon release by the bucket engaged by said driving portion, said carrier comprising a parallel link lever structure pivotally and swingably connecting said deflector to said support.

HENRY W. HAPMAN.

REFERENCES CITED

The following references are of record in the file of this patent:

UNITED STATES PATENTS

| Number | Name | Date |
|---|---|---|
| 442,976 | Hunt | Dec. 16, 1890 |
| 466,041 | Hunt | Dec. 29, 1891 |
| 468,109 | Hunt | Feb. 2, 1892 |
| 658,657 | Le Grand | Sept. 25, 1900 |
| 1,157,658 | Mashek | Oct. 19, 1915 |
| 1,305,599 | Goubert | June 3, 1919 |
| 1,380,343 | Balzer | June 7, 1921 |
| 1,445,277 | Hansen | Feb. 13, 1923 |
| 1,449,659 | Dworzak | Mar. 27, 1923 |
| 1,639,061 | Schiff | Aug. 16, 1927 |
| 1,750,721 | Maurel | Mar. 18, 1930 |
| 1,824,611 | Maurel | Sept. 22, 1931 |
| 2,096,948 | Waalkes | Oct. 26, 1937 |
| 2,104,431 | Marasso | Jan. 4, 1938 |
| 2,189,243 | Evans | Feb. 6, 1940 |